United States Patent
Klein et al.

(10) Patent No.: US 6,684,111 B2
(45) Date of Patent: Jan. 27, 2004

(54) APPARATUS FOR POWER FAILURE IDENTIFICATION IN A PROGRAMMABLE HOUSEHOLD APPLIANCE AND METHOD FOR IDENTIFYING POWER FAILURE

(75) Inventors: Hans-Wilhelm Klein, Würzburg (DE); Lothar Übler, Erlangen (DE); Horst Werkmann, Pfaffenhofen (DE)

(73) Assignee: BSH Bosch und Siemens Hausgeräte GmbH, Munich (DE)

( * ) Notice: Subject to any disclaimer, the term of this patent is extended or adjusted under 35 U.S.C. 154(b) by 37 days.

(21) Appl. No.: 10/095,243

(22) Filed: Mar. 11, 2002

(65) Prior Publication Data

US 2002/0138160 A1 Sep. 26, 2002

Related U.S. Application Data

(63) Continuation of application No. PCT/EP00/08864, filed on Sep. 11, 2000.

(30) Foreign Application Priority Data

Sep. 9, 1999 (DE) ......................................... 199 43 124

(51) Int. Cl.$^7$ ............................................. G05B 19/042
(52) U.S. Cl. ............................. 700/21; 700/81; 714/15; 714/22
(58) Field of Search ................................ 307/116, 125, 307/126, 130; 340/635; 700/21, 79, 81, 293; 702/58, 60; 714/2, 15, 21, 22, 25

(56) References Cited

U.S. PATENT DOCUMENTS

| | | | |
|---|---|---|---|
| 4,241,400 A | | 12/1980 | Kiefer .......................... 364/400 |
| 4,412,284 A | * | 10/1983 | Kerforne et al. ............. 364/200 |
| 4,631,658 A | * | 12/1986 | Easthill ....................... 364/184 |
| 4,819,237 A | * | 4/1989 | Hamilton et al. .............. 371/66 |
| 5,202,582 A | | 4/1993 | Szynal et al. .................. 307/39 |
| 5,481,452 A | * | 1/1996 | Simmons ..................... 364/141 |

FOREIGN PATENT DOCUMENTS

EP        0 027 432 A2     4/1981

* cited by examiner

Primary Examiner—Paul P. Gordon
(74) Attorney, Agent, or Firm—Laurence A. Greenberg; Werner H. Stemer; Gregory L. Mayback

(57) ABSTRACT

An apparatus for power failure identification in a programmable household appliance includes an electronic program control apparatus having a first device disposed upstream of the mains switch on the power supply system side and a second device disposed downstream from the mains switch on the appliance side for identifying an electrical variable of the external power supply system or of the supply system in the household appliance. The program control apparatus compares the signals produced by each of the devices from the electrical variables to decide whether the failure or the change in the electrical variable of the household appliance is due to a failure of the external power supply system, or due to the household appliance being switched off deliberately.

21 Claims, 5 Drawing Sheets

APPARATUS FOR POWER FAILURE IDENTIFICATION IN A PROGRAMMABLE HOUSEHOLD APPLIANCE AND METHOD FOR IDENTIFYING POWER FAILURE

CROSS-REFERENCE TO RELATED APPLICATION

This application is a continuation of copending International Application No. PCT/EP00/08864, filed Sep. 11, 2000, which designated the United States.

BACKGROUND OF THE INVENTION

Field of the Invention

The invention relates to an apparatus for power failure identification in a household appliance. The appliance is supplied through a mains switch from an electrical power supply system, is programmable and can be switched off by an operator deliberately even while the program is running. The appliance has an electronic program control apparatus and an electronic memory for recording the program status, in which, if the power supply system fails, the program status that has been reached can be stored. In which case it is possible to decide in the program control apparatus whether the failure of the electrical variable of the household appliance is due to a failure of the power supply system or due to the household appliance being switched off deliberately, and in which case once the failure of the power supply system has ended, the program control apparatus can cause the running of the program to be continued from the program status that has been reached.

An apparatus is disclosed from European Patent Application EP 0 027 432 A2, and describes a circuit by which data that relates to an operating program in a household appliance, in particular, a washing machine, can be stored in digital form in an electronic data memory. A program control apparatus is integrated in the household appliance, which ensures that the program data is stored in the memory at specific time intervals while the operating program is running. The program control apparatus calls the data when the supply voltage is restored after an intentional or random interruption in it.

The prior art household appliance has an on/off switch through which the appliance is connected to the electrical power supply system. The program control apparatus receives input signals and produces output signals. It is also connected to an electronic memory, in which data can still be stored in digital form even in the event of a power failure. Storage is possible because a battery is provided in the household appliance, by which the program control unit and the data memory can be supplied with power in the event of a power failure. When the mains voltage is restored after a power failure, the program control apparatus restarts the program counter at a zero value after a reset cycle and then, provided the data stored in the memory is correct, continues the operating program that is to be run from approximately the point where it had been interrupted. However, if the operator switched off the household appliance, no standby voltage supply is provided by the battery once the voltage has been switched off, so that the memory loses its data.

SUMMARY OF THE INVENTION

It is accordingly an object of the invention to provide an apparatus for power failure identification in a programmable household appliance that overcomes the hereinafore-mentioned disadvantages of the heretofore-known devices and methods of this general type and that reduces the circuit complexity within the household appliance as compared to prior art household appliances.

With the foregoing and other objects in view, in a programmable household appliance configured to be switched off by an operator deliberately even while a program is running there is provided, in accordance with the invention, a power failure identification apparatus including a power supply, a mains switch supplying power to the appliance from an external electrical power supply system, the mains switch electrically connected to the power supply, an electronic program control apparatus electrically connected to the power supply and to the mains switch, the control apparatus having a memory for recording a program status of the appliance, a first identification device disposed between the mains switch and the external power supply system, a second identification device disposed between the mains switch and the appliance, the first and second identification devices each identifying an electrical variable of at least one of the external power supply system and the power supply, and producing an output signal based upon the electrical variable and the control apparatus programmed to store the program status if the external power supply system fails, to compare the output signal of each of the first and second identification devices, to determine whether one of a failure and a change in a respective electrical variable is due to a failure of the external power supply system or to the operator deliberately switching off the appliance, and to continue running the program from a point defined by the program status once the failure of the external power supply system has ended.

According to the invention, a first identification device, which is upstream of the mains switch on the side of the power supply system, and a second identification device, which is downstream from the mains switch on the appliance side, are provided to identify an electrical variable of the power supply system or of the supply system in the household appliance, and in that it is possible to decide, by a comparison of the signals produced by each of the devices from the electrical variables, in the program control apparatus whether the failure or the change in the electrical variable of the household appliance is due to a failure of the power supply system or to the household appliance being switched off deliberately.

These identification devices make it possible to distinguish between the return of the power supply system after a random power failure and the system being switched on again by the mains switch after having previously been switched off deliberately by the mains switch. The decision feature in this case is that the mains voltage is still present upstream of the mains switch in the second case. It is, therefore, necessary to check both for the presence of the mains voltage directly at the mains connection of the household appliance, that is to say, upstream of the mains switch, and downstream from it. These measurement variables are detected and evaluated in a part of the program control apparatus. Thus, the invention provides a solution, which is less costly than the prior art, saves more space, and does not require a complex switching mechanism.

It is self-evident that the expression identification device or means for identifying an electrical variable also, for the purposes of the invention, covers an identification device or means for identifying a magnetic field that is produced as a result of an electric current flowing.

In accordance with another feature of the invention, the identification device on the power supply system side for identifying the supply voltage are isolated, that is to say conductively isolated, from the potential of the mains voltage. By way of example, a circuit having at least one optocoupler is provided, with this circuit having at least one transmitting diode on the input side and at least one receiving diode or phototransistor on the output side. Its signal is then amplified and is supplied to the program control unit.

Electrical circuits for household appliances that use water and that have a door-operated switch are disclosed in U.S. Pat. No. 5,202,582 to Szynal et al. and U.S. Pat. No. 4,241,400 to Kiefer. All the electrical loads are switched off when the door is opened.

In accordance with a further feature of the invention, the current through the transmitting diode of the optocoupler is preferably limited by a power supply system capacitor or a power series resistor. A capacitor of a radio suppression filter is also suitable for use as a power supply system capacitor. A relay or a transformer can also be used, as an alternative to the use of an optocoupler. The output signal from the receiving diode or from the phototransistor is digitized by a level converter, preferably, a Schmitt trigger.

In accordance with an added feature of the invention, the voltage from the device identifying the presence of a voltage within the appliance is preferably the voltage produced by a power supply unit within the appliance.

In accordance with an additional feature of the invention, program control apparatus contains a microcontroller, which is connected to both devices for identifying the voltages. The microcontroller can preferably be reset by a power supply unit in the household appliance. The microcontroller has inputs for checking control elements and sensors, as well as outputs for controlling actuators and control indications or operating displays. The microcontroller preferably has a non-volatile memory, in particular an EEPROM.

While an operating program is running, the data that reflects the program status that has in each case been reached is preferably stored cyclically in the memory.

In accordance with yet another feature of the invention, in the event of an interruption that is caused by an interruption switch, for example, a door-operated switch, by the user, for example, when a piece of laundry is subsequently inserted into a washing machine during the washing process, the running of the program can be continued once the interruption has ended.

In accordance with yet a further feature of the invention, there is provided an energy store for supplying electricity to the microcontroller after a power failure, the control apparatus being programmed to store the data relating to the given point in the program run in the memory after identification of a power failure.

In accordance with yet an added feature of the invention, there is provided an interruption switch, and a third identification device is associated with the interruption switch, the third identification device identifying a deliberate program interruption and producing an output signal and the control apparatus is programmed to decide, based upon the output signal of the third identification device, whether one of a failure and a change in an electrical variable of the appliance is due to a failure of the power supply system, to a deliberate switching off by the operator, or to a deliberate program interruption, to store, in the memory, the program status reached at a time when the program was interrupted, and once the program interruption has ended, to continue running the program from the stored program status.

With the objects of the invention in view, in a programmable household appliance configured to be switched off by an operator deliberately even while a program is running, there is also provided a power failure identification apparatus including a power supply, a mains switch supplying power to the appliance from an external electrical power supply system, the mains switch electrically connected to the power supply, an electronic program control apparatus electrically connected to the power supply and to the mains switch, the control apparatus having a memory for recording a program status of the appliance, a first means for identifying an electrical variable disposed between the mains switch and the external power supply system, a second means for identifying an electrical variable disposed between the mains switch and the appliance, the first and second identification means each identifying an electrical variable of at least one of the external power supply system and the power supply, and producing an output signal based upon the electrical variable, and the control apparatus programmed to store the program status if the external power supply system fails, to compare the output signal of each of the first and second identification devices, to determine whether one of a failure and a change in a respective electrical variable is due to a failure of the external power supply system or to the operator deliberately switching off the appliance, and to continue running the program from a point defined by the program status once the failure of the external power supply system has ended.

With the objects of the invention in view, there is also provided a method for identifying a power failure in a programmable household appliance configured to be switched off by an operator deliberately even while a program is running, including the steps of connecting a first identification device between the mains switch and the external power supply system and connecting a second identification device between the mains switch and the appliance, supplying power to the appliance through a mains switch from an external electrical power supply system, storing a program status in a memory of an electronic program control apparatus if the external power supply system fails, identifying one of an electrical variable of the power supply system and an electrical variable of the supply system in the appliance with the first and second identification devices and producing a respective output signal from the first and second identification devices, determining, with the control apparatus, whether one of a failure and a change of the electrical variable is due to a failure of the external power supply system or to a deliberate switching off of the appliance by the operator by comparing the signals produced by each of the first and second identification devices, and continuing the program from the stored program status once the failure of the power supply system has ended.

Other features that are considered as characteristic for the invention are set forth in the appended claims.

Although the invention is illustrated and described herein as embodied in an apparatus for power failure identification in a programmable household appliance, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
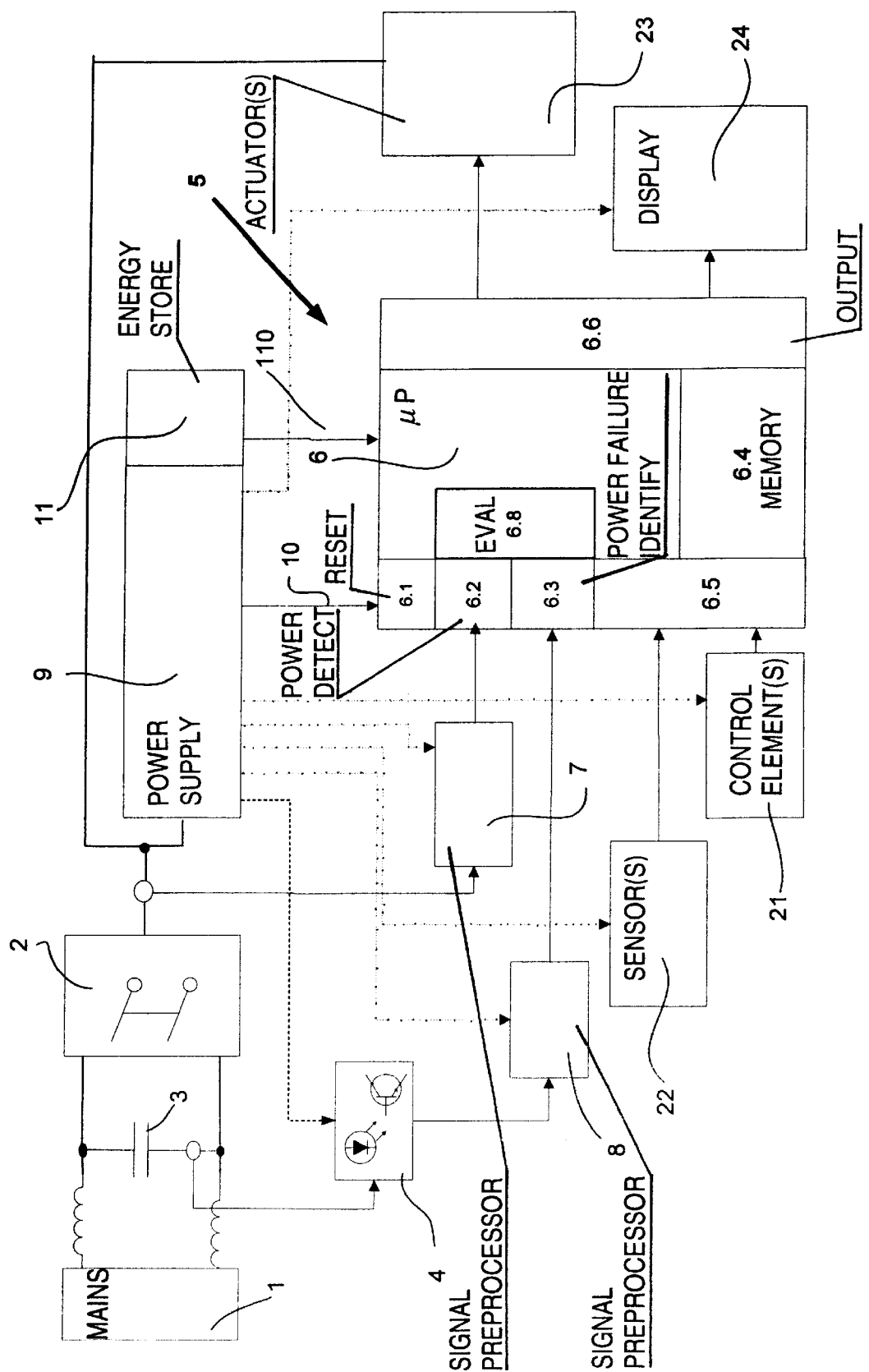
FIG. 1 is a block and schematic circuit diagram of a power supply system within a programmable household appliance according to the invention.

Referring now to the figures of the drawings in detail and first, particularly to FIG. 1 thereof, there is shown a household appliance connected through a mains input 1 to an electrical power supply system. A capacitor 3, which is used as a suppression capacitor in a radio suppression filter, is connected between the poles of the mains input 1, between the mains input 1 and a mains switch 2 downstream therefrom. The capacitor 3 may at the same time he used for current limiting for the transmitting diode of an optocoupler 4 in an optocoupler circuit, with the transmitting diode being used as DC-isolated device for detecting the mains voltage. An optocoupler circuit including a number of optocouplers is preferably used, to make possible the detection of both half-cycles of the mains voltage. The current through the transmitting diode of the optocoupler 4 is limited through a power series resistor or a power supply system capacitor, as represented by the capacitor 3. On the output side, the optocoupler 4 has a phototransistor, which is switched on when the mains voltage is present. A photodiode can likewise be used instead of the phototransistor.

The signal from the optocoupler 4 is supplied as a digital signal to a program control apparatus 5 that has a microcontroller 6 as a programmable module. The microcontroller 6 has a reset input 6.1 that receives a signal if the power supply unit 9 detects a power supply system undervoltage or if a mains voltage failure occurs, an input 6.2 for detecting the mains voltage downstream from the mains switch 2, that is to say, the voltage within the appliance, and an input 6.3 for identifying a power failure upstream of the mains switch 2. The signal that is supplied to the input 6.2 is obtained in an apparatus 7 for signal preprocessing from the internal mains voltage signal, with the device 7 being, for example, a level converter. When the AC mains voltage is present, the level converter produces a small DC voltage, which can be detected by the input 6.2. In a corresponding manner, the output signal that is produced by the optocoupler 4 as a DC-isolation apparatus is supplied to a device 8 for signal preprocessing, which is preferably likewise a level converter or has such a level converter. The device 8 is connected to the input 6.3. In contrast to the device 7, the device 8 must have the described DC isolation in order to make it possible to switch off all poles of the household appliance, such that they are free of voltage and potential, using the mains switch 2.

The microcontroller 6 also has a memory 6.4, in particular, a non-volatile memory, for example, an EEPROM, which stores the states of the inputs 6.5 that are required for selecting and running the dishwashing or washing programs and that are connected to control elements 21 and sensors 22, as well as states of the outputs 6.6 for controlling actuators 23 and operating display 24. In a washing machine, the actuators 23 are, for example, a triac for controlling the motor, resistance heating, electrical valves, etc.

Depending on the requirement for the accuracy of restarting after a power failure, the data for the program status that had been reached is written to the non-volatile memory 6.4 cyclically or after identification of a power failure.

A power supply unit 9 has a sufficiently large energy store 11 for such a situation, which is connected through a supply line 110 to the microcontroller 6. The energy store 11 provides a reliable supply to the microcontroller 6 after a power failure until the data protection process, that is to say, the storage of the program status that has been reached and further data, has been completed, and the ending of the program is initiated in the microcontroller 6 through a reset signal. The reset signal is provided through the signal line 10, for example shortly before the supply voltage to the microcontroller 6 has fallen to the value at which it is no longer possible for the microcontroller 6 to operate correctly.

Figure 3:
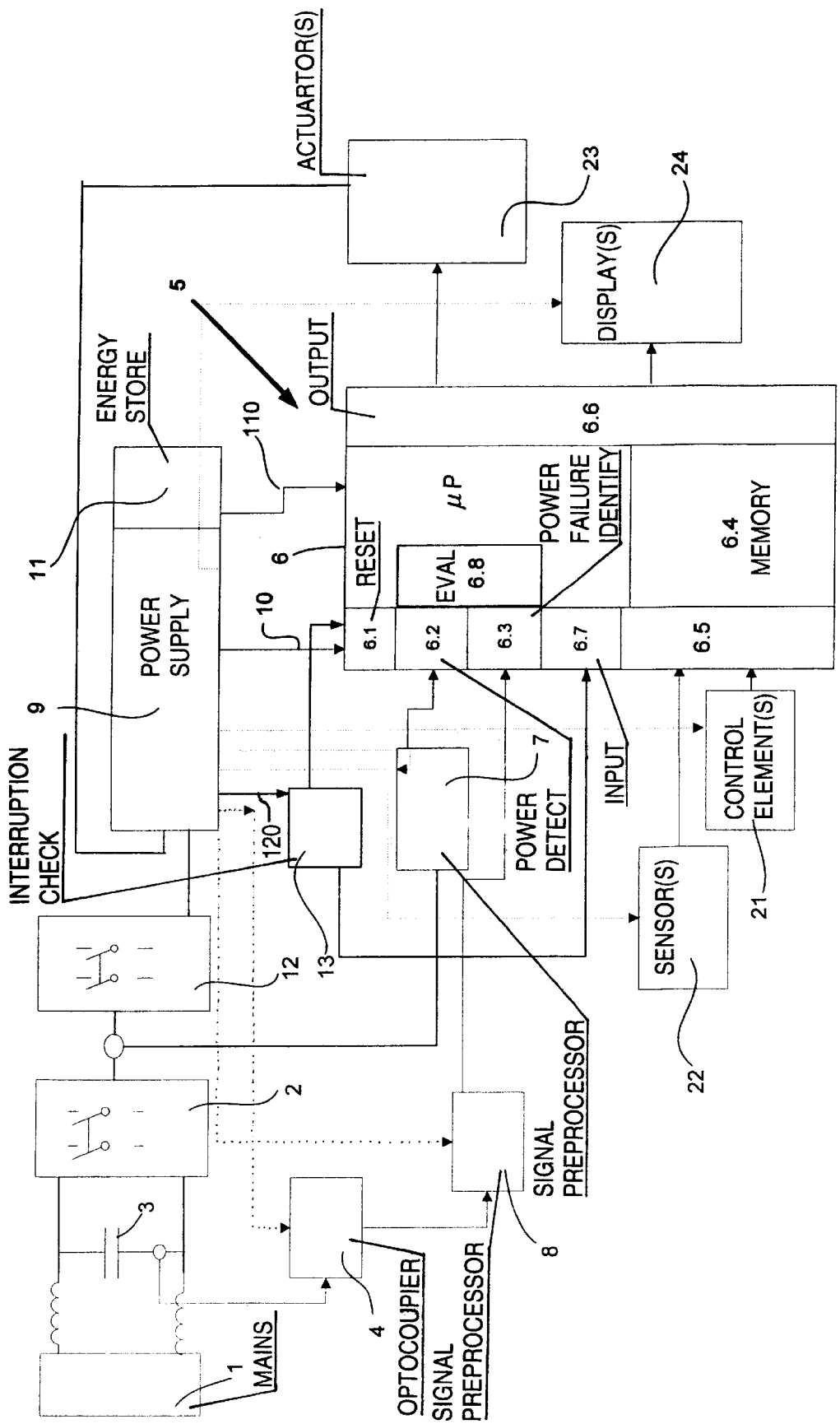
FIG. 3 is a block and schematic circuit diagram of a further embodiment of the power supply system of FIG. 1.
Figure 5:
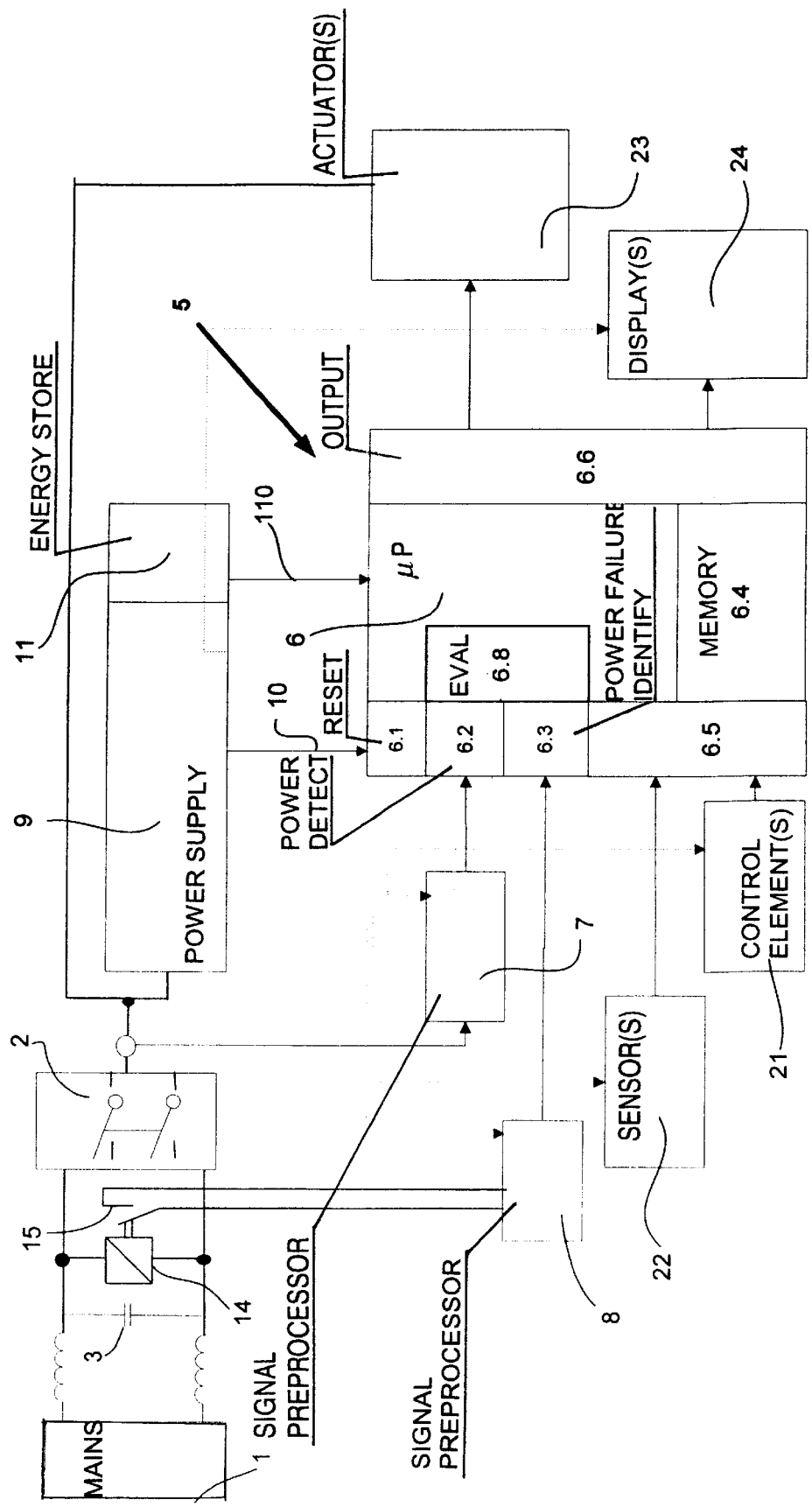
FIG. 5 is a block and schematic circuit diagram of a further embodiment of the power supply system of FIG. 1.

In FIGS. 1, 3, 5, those connecting lines that are not annotated between the individual functional units and the power supply unit 9 and that are used for the logic supply are represented by the dotted lines. In one advantageous refinement, once the mains voltage failure has been confirmed by the device 7 and through the input 6.2 of the microcontroller 6, a check of the optocoupler 4, of the device 8, and of the input 6.3 is initiated, with the aim of finding out whether the mains voltage has also failed upstream of the mains switch 2.

If there is no voltage at the input 6.2 (FIG. 1), the input 6.3 is checked. If the mains voltage is present at the input 6.3 (state "1"), an evaluation circuit 6.8 (FIG. 1) for evaluation by the software within the microcontroller 6 determines that the program of the household appliance is intended to be restarted once the household appliance is switched on again.

Figure 2:
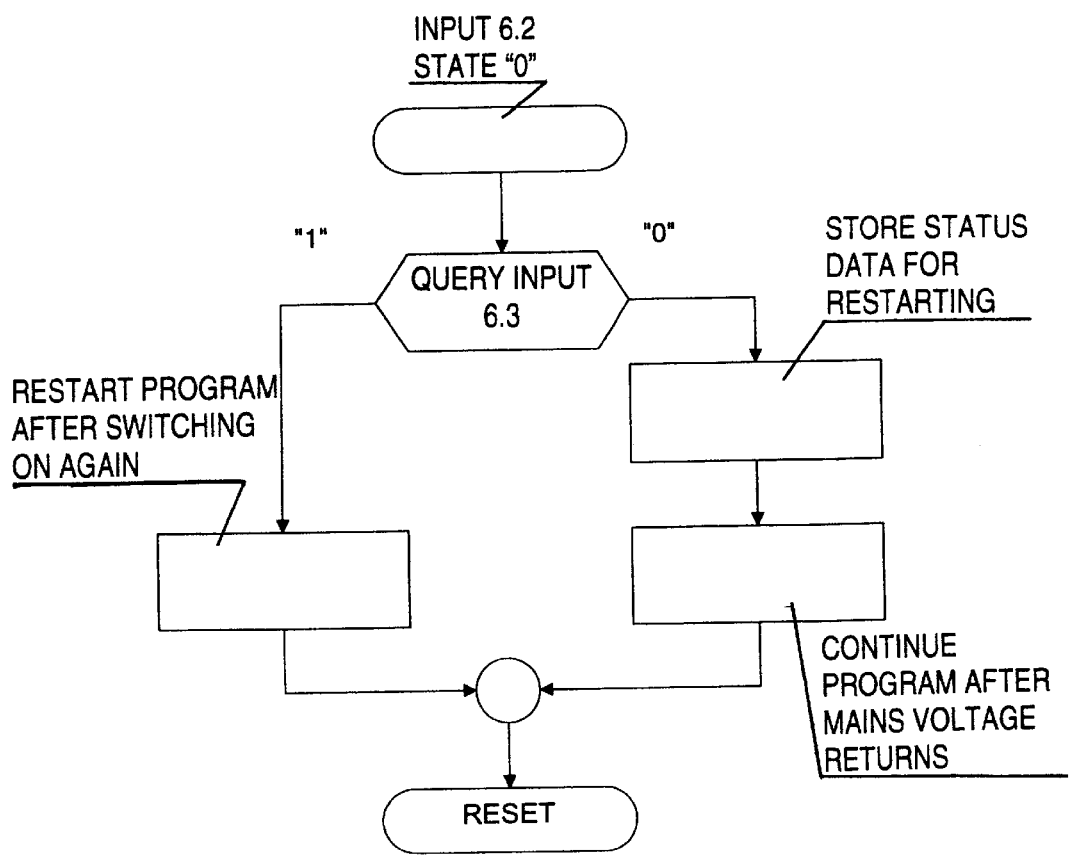
FIG. 2 is a flowchart for distinguishing between a random power supply system interruption and a deliberate interruption in an operating program according to the invention.

If, however, both the mains voltage at the input 6.3 and the supply voltage within the household appliance at the input 6.2 fail (state "0"), the program status that has been reached is stored in the memory 6.4 until being reused after the mains voltage failure, so that the household appliance then continues the program. In such a case, information, for example, the setting of a program continuation flag, is also stored that, once the mains voltage has returned, causes the microcontroller 6 to resume the running of the program using the program status data (FIG. 2). A section of the evaluation program that is illustrated by a flowchart in FIG. 2, and that is referred to as an undervoltage routine, is initiated when the device 7 finds that the mains voltage has failed.

If the operator deliberately switches off the household appliance by operating the mains switch 2, the failure of the mains voltage is identified at the input 6.2. Because the voltage is still present at the input 6.3, the program status is not stored. However, the information that the program should commence from the start, or that another program should be run, when the mains voltage returns is stored. Such is done, for example, by resetting the program continuation flag. When the mains voltage returns by switching on the mains switch 2 again, the sequence is carried out in accordance with the check of the information mentioned above, with the program being restarted, that is to say, the dishwashing or washing program, or with the program run being reselected by the operator.

If the program status is stored cyclically in the memory 6.4, the sequence is reduced to setting or resetting the respective flag that indicates the program status that has been reached, or the checking of such information whenever the program is restarted after the return of the mains voltage.

The device 7 is either configured to detect low voltages—in such a case, as is illustrated in FIG. 3, it is connected to the power supply unit 9, which produces such a low voltage—or it identifies the mains voltage within the household appliance by being connected to the power supply system within the appliance immediately downstream from the mains switch 2.

In one advantageous embodiment, a programmable household appliance that is equipped with the program control apparatus 5, for example, a washing machine or dishwasher, has an interruption switch, in particular, in the form of a door-operated switch 12 (FIG. 3). In a dishwasher, the door-operated switch 12 allows the dishwashing process to be interrupted when the door to the dishwashing area is opened by operating the door-operated switch. Such interruption allows additional dishes to be placed in the dishwashing area even while a dishwashing program is running. Depending on the configuration of the household appliance, the door-operated switch 12 switches off either only the actuators 23, or else other electronic components as well. Such results in the requirement for the operating program also to continue after the door has been closed, when the electronic components have been switched off by the door-operated switch 12. To distinguish between an interruption by the mains switch 2 and an interruption by the door-operated switch 12, the microcontroller 6 has to carry out another check of the mains voltage. A device 13 that is disposed downstream from the door-operated switch 12 (or downstream from any other interruption switch) is provided for such a purpose, which, on the input side, either detects the mains voltage that is being switched by being connected immediately downstream of the door-operated switch 12, or detects that a low voltage is being supplied from the power supply unit 9, which is switched as a function of the position of the door-operated switch 12, and is supplied through the signal line 120 to the device 13, as is illustrated in FIG. 3, and is connected on the output side through an input 6.7 to the microcontroller 6.

For the situation where the door-operated switch 12 is supplied with the voltage produced by the power supply unit 9, the device 13 can likewise be used in the manner described above, provided it is disposed downstream from the door-operated switch 12. If there is a door-operated switch 12, the device 7 is connected upstream of it and downstream from the mains switch 2 so that it detects the presence or absence of the voltage within the appliance in all cases.

Figure 4:
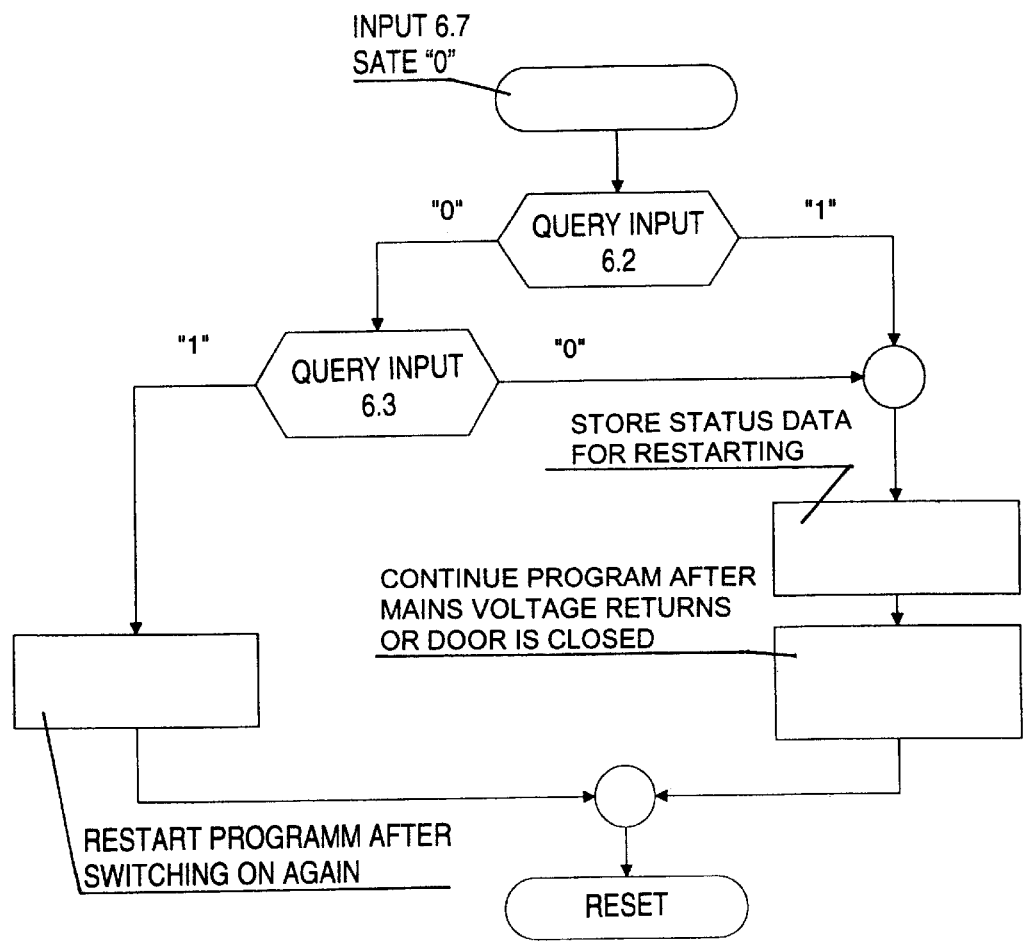
FIG. 4 is a flowchart for distinguishing between a random power supply system interruption and a deliberate interruption in an operating program with a program interruption function according to the invention.

If, as is shown in the form of a flowchart in FIG. 4, the door-operated switch 12 or some other corresponding interruption switch is present at the input 6.7 associated with the device 13, and the voltage state "0" is detected, the microcontroller checks the input 6.2 for the presence of a voltage at the input 6.2. If such is the case, which at the same time also means that the mains voltage is present at the input 6.3, the program status that has currently been reached is checked to restart the program when the door is closed, that is to say, after the end of such an interruption.

When the signal "0" is present at the input 6.7 while the signal "0" is also at the same time present at the input 6.2, meaning that the supply voltage within the appliance is switched off and that, in addition, the supply voltage has been interrupted by the door-operated switch 12, provided the mains voltage is present at the input 6.3 (state "1"), the microcontroller 6 ensures that an operating program, or the same operating program, is started once again when the household appliance is switched on again.

If, on the other hand, after an interruption in the running of the program resulting from operation of the door-operated switch 11, no voltage signal is present at any of the inputs 6.7, 6.2, or 6.3, that is to say, the voltage of both the supply voltage and the mains voltage is 0, the program status that has been reached is stored, so that the program is continued once the mains voltage is present again and after the closing of the door by the door-operated switch 12, or after the end of the interruption by the mains switch 2.

In another exemplary embodiment of the invention (FIG. 5), a relay 14 is provided instead of the optocoupler 4, and the relay 14 is disposed in the region between the mains input 1 and the mains switch 2 and, if a radio suppression capacitor 3 is fitted, is connected in parallel therewith. The relay 14 has the advantage that the signal preprocessing for the mains voltage detection can be carried out more easily and at a lower cost for the microcontroller 6. The relay 14 is configured to be energized with an AC mains voltage, and offers the necessary DC isolation between the field circuit (mains voltage) and the contact circuit (connection to the microcontroller 6). When the normally open contact 15 of the relay 14 is closed by the presence of the mains voltage upstream of the mains switch 2, the microcontroller 6 detects the presence of the mains voltage, through the input 6.3. In the event of a power failure, the relay 14 trips. The corresponding evaluation is carried out in the software evaluation circuit 6.8 within the microcontroller 6, as is illustrated in FIGS. 3 and 5. If the relay 14 is used instead of the optocoupler 4, care must be taken to ensure that the relay tripping time is shorter than the checking time period of the program control apparatus 5.

Instead of detecting electrical variables such as the mains voltage between the mains input 1 and the mains switch 2, magnetic variables, for example, magnetic induction, can also be detected and can be supplied as input variables to the microcontroller 6.

We claim:

1. In a programmable household appliance configured to be switched off by an operator deliberately even while a program is running, a power failure identification apparatus comprising:

a power supply;

a mains switch supplying power to the appliance from an external electrical power supply system, said mains switch electrically connected to said power supply;

an electronic program control apparatus electrically connected to said power supply and to said mains switch, said control apparatus having a memory for recording a program status of the appliance;

a first identification device disposed between said mains switch and the external power supply system;

a second identification device disposed between said mains switch and the appliance;

said first and second identification devices each:
  identifying an electrical variable of at least one of:
    the external power supply system; and
    said power supply; and
  producing an output signal based upon the electrical variable; and said control apparatus programmed:
  to store the program status if the external power supply system fails;
  to compare said output signal of each of said first and second identification devices;
  to determine whether one of a failure and a change in a respective electrical variable is due:
    to a failure of the external power supply system; or
    to the operator deliberately switching off the appliance; and to continue running the program from a point defined by the program status once the failure of the external power supply system has ended.

2. The apparatus according to claim 1, wherein said first identification device is isolated from a potential of the mains voltage.

3. The apparatus according to claim 2, wherein said first identification device has a circuit with an input side and an output side, said circuit having:
   at least one optocoupler;
   a transmitting diode disposed on said input side; and
   a device selected from one of the group consisting of a receiving diode and a phototransistor disposed on said output side.

4. The apparatus according to claim 3, including a current limiter limiting current through said transmitting diode of said optocoupler.

5. The apparatus according to claim 4, wherein said current limiter is one of the group consisting of a power supply system capacitor and a power series resistor.

6. The apparatus according to claim 5, including a radio suppression filter having a filter capacitor, said power supply system capacitor being said filter capacitor.

7. The apparatus according to claim 2, wherein said first identification device is one of the group consisting of a relay and a transformer.

8. The apparatus according to claim 3, wherein:
   said device produces an output signal; and
   a level converter digitizes said output signal of said device.

9. The apparatus according to claim 8, wherein said level converter is a Schmitt trigger.

10. The apparatus according to claim 1, wherein:
    said power supply produces a voltage; and
    said second identification device identifies said voltage produced by said power supply.

11. The apparatus according to claim 1, wherein said control apparatus has a microcontroller electrically connected to said first identification device and to said second identification device.

12. The apparatus according to claim 11, wherein said power supply is electrically connected to and resets said microcontroller.

13. The apparatus according to claim 11, including at least one control element and at least one sensor, said microcontroller having inputs electrically connected to said control element and to said sensor for checking said control element and said sensor.

14. The apparatus according to claim 11, including at least one actuator and at least one operating display, said microcontroller having outputs electrically connected to said actuator and said operating display for controlling said actuator and said operating display.

15. The apparatus according to claim 11, wherein said microcontroller has a non-volatile memory.

16. The apparatus according to claim 15, wherein said non-volatile memory is an EEPROM.

17. The apparatus according to claim 15, wherein said control apparatus is programmed to cyclically store, in said memory, data relating to the program status during a run of the program.

18. The apparatus according to claim 17, including an energy store for supplying electricity to said microcontroller after a power failure, said control apparatus being programmed to store the data relating to the given point in the program run in said memory after identification of a power failure.

19. The apparatus according to claim 1, including an interruption switch, and wherein:
   a third identification device is associated with said interruption switch, said third identification device identifying a deliberate program interruption and producing an output signal; and
   said control apparatus is programmed:
      to decide, based upon said output signal of said third identification device, whether one of a failure and a change in an electrical variable of the appliance is due:
         to a failure of the power supply system;
         to a deliberate switching off by the operator; or
         to a deliberate program interruption;
      to store, in said memory, the program status reached at a time when the program was interrupted; and
      once the program interruption has ended, to continue running the program from the stored program status.

20. In a programmable household appliance configured to be switched off by an operator deliberately even while a program is running, a power failure identification apparatus comprising:
   a power supply;
   a mains switch supplying power to the appliance from an external electrical power supply system, said mains switch electrically connected to said power supply;
   an electronic program control apparatus electrically connected to said power supply and to said mains switch, said control apparatus having a memory for recording a program status of the appliance;
   a first means for identifying an electrical variable disposed between said mains switch and the external power supply system;
   a second means for identifying an electrical variable disposed between said mains switch and the appliance;
   said first and second identification means each:
      identifying an electrical variable of at least one of:
         the external power supply system; and
         said power supply; and
      producing an output signal based upon the electrical variable; and
   said control apparatus programmed:
      to store the program status if the external power supply system fails;
      to compare said output signal of each of said first and second identification devices;
      to determine whether one of a failure and a change in a respective electrical variable is due:
         to a failure of the external power supply system; or
         to the operator deliberately switching off the appliance; and
      to continue running the program from a point defined by the program status once the failure of the external power supply system has ended.

21. A method for identifying a power failure in a programmable household appliance configured to be switched off by an operator deliberately even while a program is running, which comprises:
   connecting a first identification device between the mains switch and the external power supply system and connecting a second identification device between the mains switch and the appliance;
   supplying power to the appliance through a mains switch from an external electrical power supply system;
   storing a program status in a memory of an electronic program control apparatus if the external power supply system fails;

identifying one of an electrical variable of the power supply system and an electrical variable of the supply system in the appliance with the first and second identification devices and producing a respective output signal from the first and second identification devices;

determining, with the control apparatus, whether one of a failure and a change of the electrical variable is due to a failure of the external power supply system or to a deliberate switching off of the appliance by the operator by comparing the signals produced by each of the first and second identification devices; and continuing the program from the stored program status once the failure of the power supply system has ended.

* * * * *